(No Model.)
C. A. GALE.
CLIP FOR WAGONS.
No. 321,707. Patented July 7, 1885.
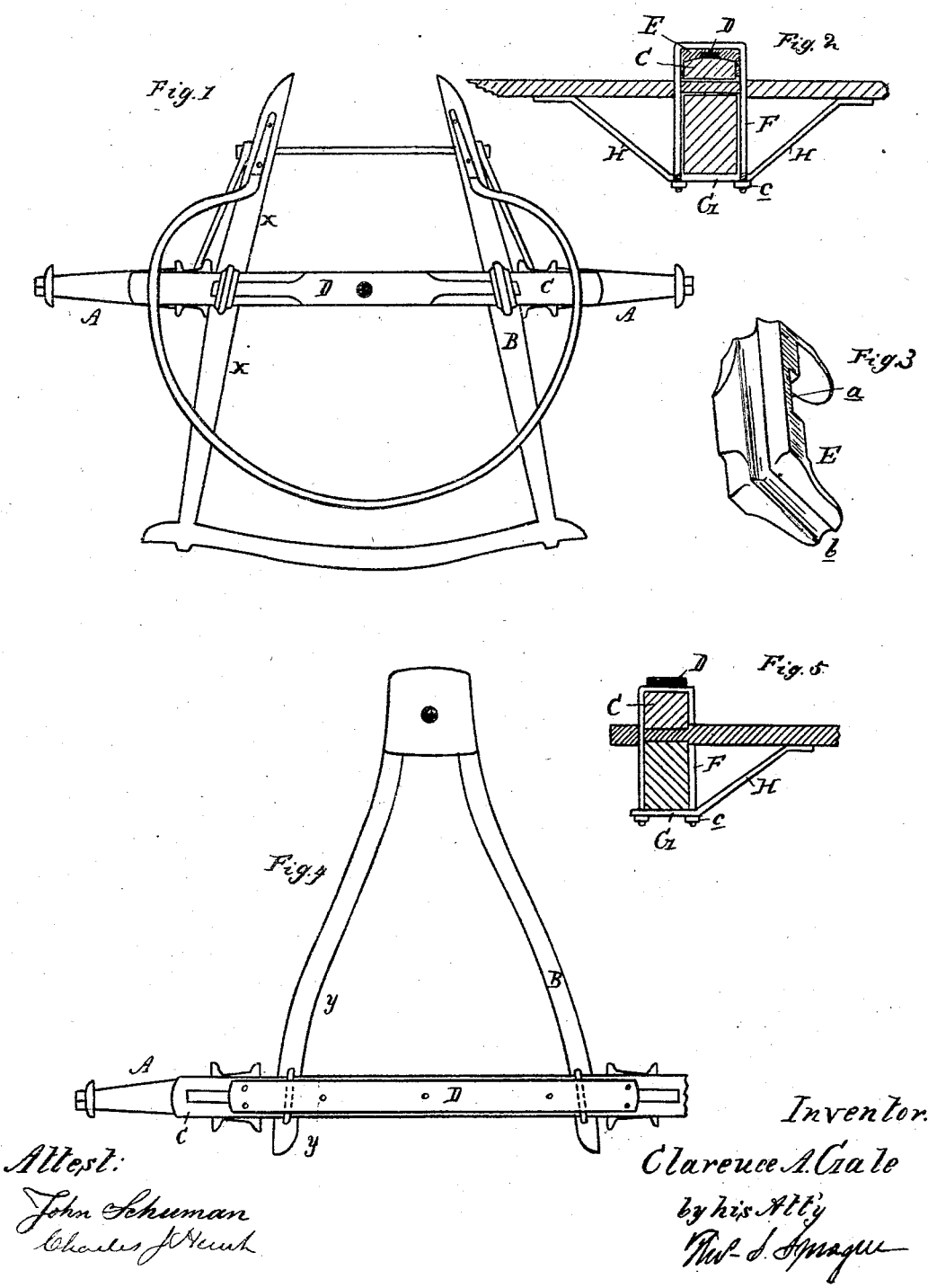
Attest:
John Schuman
Charles J. Hunt
Inventor:
Clarence A. Gale
by his Att'y
Thos. S. Sprague

United States Patent Office.

CLARENCE A. GALE, OF BIG RAPIDS, MICHIGAN.

CLIP FOR WAGONS.

SPECIFICATION forming part of Letters Patent No. 321,707, dated July 7, 1885.

Application filed May 13, 1885. (No model.)

*To all whom it may concern:*

Be it known that I, CLARENCE A. GALE, of Big Rapids, in the county of Mecosta and State of Michigan, having invented new and useful Improvements in Wagons; and I do hereby declare that the following is a full, clear, and exact description thereof, reference being had to the accompanying drawings, which form a part of this specification.

This invention relates to certain new and useful improvements in the construction of wooden axle-tree wagons; and the invention consists in the peculiar construction of saddles and clips by means of which the bolster, sand-boards, and bolster-plates are secured rigidly to their positions without the necessity of weakening any of them by boring through them for the reception of bolts, as in the ordinary construction of wagons, all as more fully hereinafter set forth.

Figure 1 is a plan view of a front axle provided with my improvements. Fig. 2 is a section on the line $x\ x$ in Fig. 1. Fig. 3 is a perspective of the saddle detached. Fig. 4 is a plan view of the rear axle with its attachments, and Fig. 5 is a section on the line $y\ y$ therein.

In the accompanying drawings, which form a part of this specification, A represents the forward axle, which is provided with the hounds B. Upon the top of this axle is placed the sand-board C, upon which in turn rests the bolster-plate D.

E represents a metallic saddle, which is provided in its under face with a recess, $a$, to receive the ends of the bolster-plate D, such saddle, when in place, embracing upon the top and sides the end of the bolster-plate and the sand-board, as shown in Fig. 2. In the outer face of this saddle is formed a channel, $b$, which receives the clip F, the lower ends of which pass through a tie-bar, G, and receive nuts $c$ upon their ends. These tie-bars G may be provided, if desired, with braces H, for the purpose of strengthening or giving greater rigidity to the hounds.

By this means of securing the sand-board and bolster-plate upon the axle, the boring or recessing of the axle or its superimposed parts is avoided, with the exception of that hole through them which is necessary for the reception of the king-bolt, while I at the same time produce a structure that is simple and easily repaired. The bolster upon the rear axle may be secured together in substantially the same manner.

What I claim as my invention is—

1. A securing-saddle for wagons having an interior recess, $a$, to receive the ends of the bolster-plate, and an exterior recesss, $b$, to receive the clip F, combined with said plate and clip, axle A, plate G, and securing means $c$, as set forth.

2. The combination, with the axle, sand-board C, bolster-plate D, and hounds B, of the saddle E, having interior recess, $a$, and external recess, $b$, upon three sides, the clip F, plate G, nuts $c$, and braces H, all constructed and arranged to serve as and for the purposes set forth.

CLARENCE A. GALE.

Witnesses:
CHARLES M. DARRAH,
J. F. CLARK.